United States Patent
Ookubo et al.

(10) Patent No.: US 11,826,967 B2
(45) Date of Patent: Nov. 28, 2023

(54) METHOD OF MANUFACTURING CLOSED CROSS-SECTION STRUCTURAL MEMBER

(71) Applicant: Nissan Motor Co., Ltd., Kanagawa (JP)

(72) Inventors: Hiroshi Ookubo, Kanagawa (JP); Kentaro Kono, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 21 days.

(21) Appl. No.: 17/598,111

(22) PCT Filed: Mar. 26, 2019

(86) PCT No.: PCT/IB2019/000315
§ 371 (c)(1),
(2) Date: Sep. 24, 2021

(87) PCT Pub. No.: WO2020/194008
PCT Pub. Date: Oct. 1, 2020

(65) Prior Publication Data
US 2022/0250337 A1    Aug. 11, 2022

(51) Int. Cl.
*B29C 70/30* (2006.01)
*B29C 65/48* (2006.01)
*B29C 70/54* (2006.01)
*B29C 70/88* (2006.01)
*B29L 31/30* (2006.01)
*B32B 37/12* (2006.01)

(52) U.S. Cl.
CPC .............. *B29C 70/30* (2013.01); *B29C 65/48* (2013.01); *B29C 70/54* (2013.01); *B29C 70/88* (2013.01); *B29L 2031/30* (2013.01); *B32B 37/12* (2013.01); *B32B 2037/1253* (2013.01); *B32B 2305/076* (2013.01)

(58) Field of Classification Search
CPC ........ B32B 2260/021; B32B 2305/076; B29C 70/30; B62D 25/04
See application file for complete search history.

(56) References Cited

FOREIGN PATENT DOCUMENTS

| JP | 2014233999 A | * | 12/2014 |
| JP | 2015160524 A | * | 9/2015 |
| JP | 2015160524 A |   | 9/2015 |

* cited by examiner

*Primary Examiner* — Carson Gross
(74) *Attorney, Agent, or Firm* — Osha Bergman Watanabe & Burton LLP

(57) ABSTRACT

A method of manufacturing a closed cross-section structural member is disclosed. The closed cross-section structural member includes: a first panel and a second panel joined to each other to form a closed cross-section; and a fiber reinforced plastic (FRP) material bonded to the first panel. The method includes: attaching the FRP material to the first panel with an adhesive; curing the FRP material and the adhesive by heating the FRP material and the adhesive together with the first panel; and joining the second panel to the first panel in which the FRP material and the adhesive are cured.

3 Claims, 4 Drawing Sheets

METHOD OF MANUFACTURING CLOSED CROSS-SECTION STRUCTURAL MEMBER

TECHNICAL FIELD

The present invention relates to a method of manufacturing a closed cross-section structural member, particularly to a method of manufacturing a closed cross-section structural member to which a fiber reinforced plastic material (hereinafter, referred to as "FRP material") is bonded.

BACKGROUND ART

Japanese Patent Application Publication No. 2015-160524 discloses a method of bonding a reinforcement material made of CFRP to a vehicle width direction inner wall portion of a B pillar made of steel plates. In this method, first, the reinforcement material in which a prepreg is uncured is temporarily fixed to the vehicle width direction inner wall portion of the B pillar by using tackiness of a foam adhesive. Then, a vehicle body is heated in a drying furnace to cure the prepreg and mould the reinforcement material into a predetermined shape and, at same time, to cure the adhesive and bond the reinforcement material to the vehicle width direction inner wall portion.

SUMMARY OF INVENTION

Technical Problem

However, in the aforementioned method, the following problem may occur due to the fact that the coefficient of linear expansion of CFRP is smaller than the coefficient of linear expansion of steel plates. Specifically, in a heating and curing step, the reinforcement material and the adhesive are cured and the reinforcement material is bonded to the B pillar in a state where the entire B pillar has thermally expanded at a greater degree than the reinforcement material. Then, in a subsequent cooling process, a portion of the B pillar to which the reinforcement material is bonded thermally contacts while being restrained by the reinforcement material and a portion of the B pillar to which no reinforcement material is bonded thermally contracts without being restrained by the reinforcement material. Accordingly, in the aforementioned method, the thermal contraction amount in a vehicle width direction outer portion of the B pillar is greater than that in a vehicle width direction inner portion and there is a possibility that unfavorable deformation (buckles, warps, and the like) occurs in the B pillar.

An object of the present invention is to suppress unfavorable deformation in a closed cross-section structural member to which a FRP material is bonded in manufacturing of the closed cross-section structural member.

Solution to Problem

One aspect of the present invention is a method of manufacturing a closed cross-section structural member including: a first panel and a second panel joined to each other to form a closed cross-section; and a FRP material bonded to the first panel. The method includes: attaching the FRP material to the first panel with an adhesive; curing the FRP material and the adhesive by heating the FRP material and the adhesive together with the first panel; and joining the second panel to the first panel in which the FRP material and the adhesive are cured.

Advantageous Effects of Invention

This method can suppress unfavorable deformation in the closed cross-section structural member.

DESCRIPTION OF EMBODIMENTS

Methods according to multiple embodiments are described below with reference to the drawings.

First Embodiment

Figure 1:
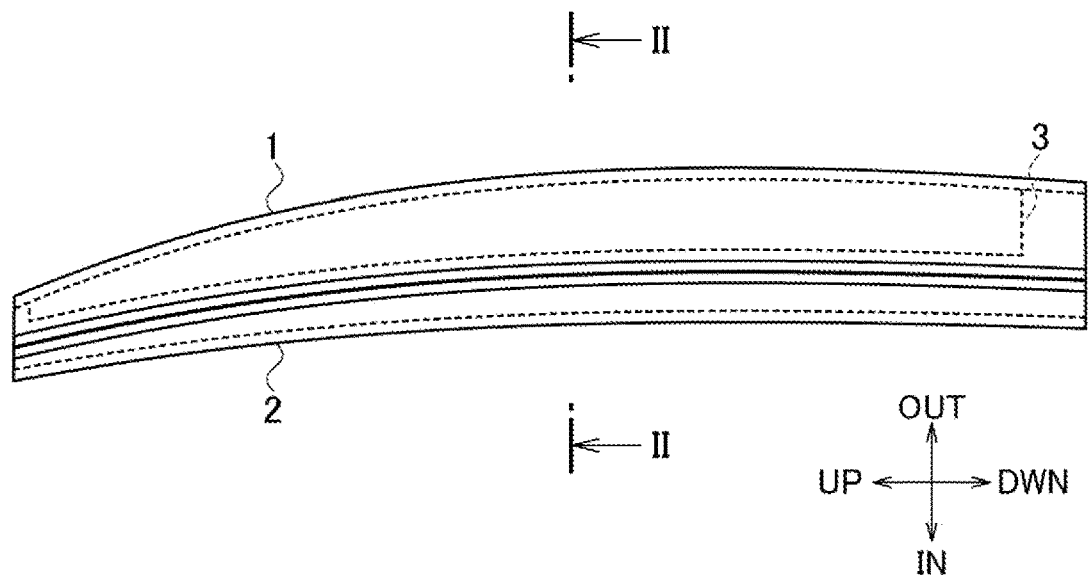
FIG. 1 is a side view of a center pillar according to a method of a first embodiment.

A closed cross-section structural member manufactured in a method according to a first embodiment is, for example, a center pillar including an outer panel 1 that is a first panel, an inner panel 2 that is a second panel, and an FRP material 3 as illustrated in FIG. 1.

The outer panel 1 and the inner panel 2 are made of, for example, steel plates. The material of the outer panel 1 and the inner panel 2 is not limited to a particular material as long as it is a material having a higher coefficient of linear expansion than the coefficient of linear expansion of the FRP material 3 and may be other metal materials such as, for example, aluminum alloy. Moreover, the material of the outer panel 1 may be different from the material of the inner panel 2.

Figure 2:
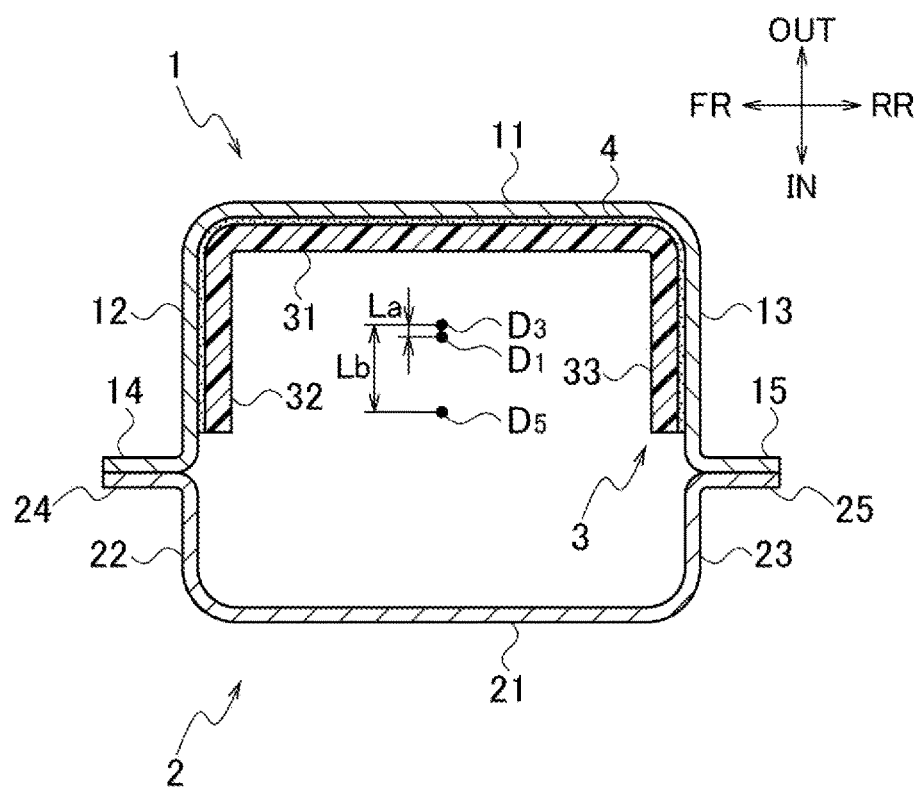
FIG. 2 is a cross-sectional view along the line II-II in FIG. 1.

For example, as illustrated in FIG. 2, the outer panel 1 and the inner panel 2 may each have a hat-shaped cross-section in a cross-section orthogonal to a longitudinal direction of the center pillar.

The outer panel 1 may include an outer wall 11 that is a first wall provided on the outer side in a vehicle width direction and a front wall 12 and a rear wall 13 that are paired second walls facing each other and extending inward in the vehicle width direction from both vehicle front-rear direction end portions of the outer wall 11. A front flange 14 may extend forward in the vehicle front-rear direction from a vehicle width direction inner end portion of the front wall 12. A rear flange 15 may extend rearward in the front-rear direction from a vehicle width direction inner end portion of the rear wall 13.

The inner panel 2 may include an inner wall 21 provided on the inner side in the vehicle width direction and a front wall 22 and a rear wall 23 facing each other and extending outward in the vehicle width direction from both vehicle front-rear direction end portions of the inner wall 21. A front flange 24 may extend forward in the vehicle front-rear direction from a vehicle width direction outer end portion of the front wall 22. A rear flange 25 may extend rearward in the vehicle front-rear direction from a vehicle width direction outer end portion of the rear wall 23.

The outer panel 1 and the inner panel 2 are joined to each other and form a closed cross-section. The front flanges 14, 24 and the rear flanges 15, 25 of the outer panel 1 and the inner panel 2 may be joined to one another by spot welding or the like.

The FRP material 3 for reinforcement is bonded to the outer panel 1 with an adhesive 4. As illustrated in FIG. 1, the FRP material 3 may extend along an extending direction of a closed cross-section space formed by the outer panel 1 and the inner panel 2. The FRP material 3 is made of, for example, a carbon fiber reinforced plastic and has a lower coefficient of linear expansion than the coefficient of linear expansion of the outer panel 1 and the coefficient of linear expansion of the inner panel 2.

Carbon fibers that are reinforcement fibers are formed of, for example, continuous fibers and may have a fabric form or a stacked structure in which sets of the reinforcement fibers aligned in one direction are stacked at various angles. For example, polyacrylonitrile (PAN based), pitch based, and cellulose based carbon fibers, vapor deposition carbon fibers using hydrocarbons, graphite fibers, and the like can be used as the carbon fibers. Two or more of the aforementioned types of fibers may be used in combination. The carbon fibers may include short fibers. A publicly known thermal setting resin can be used as a matrix resin. Specific examples include epoxy resin, phenol resin, unsaturated polyester resin, vinyl ester resin, polyimide resin, and the like.

As illustrated in FIG. 2, the FRP material 3 may have a C-shape cross-section in the cross-section orthogonal to the longitudinal direction of the center pillar. The FRP material 3 may include an outer wall 31 that is a third wall extending along the outer wall 11 of the outer panel 1 and a front wall 32 and a rear wall 33 that are paired fourth walls extending along the front wall 12 and the rear wall 13, from both vehicle front-rear direction end portions of the outer wall 31, respectively.

Figure 3:
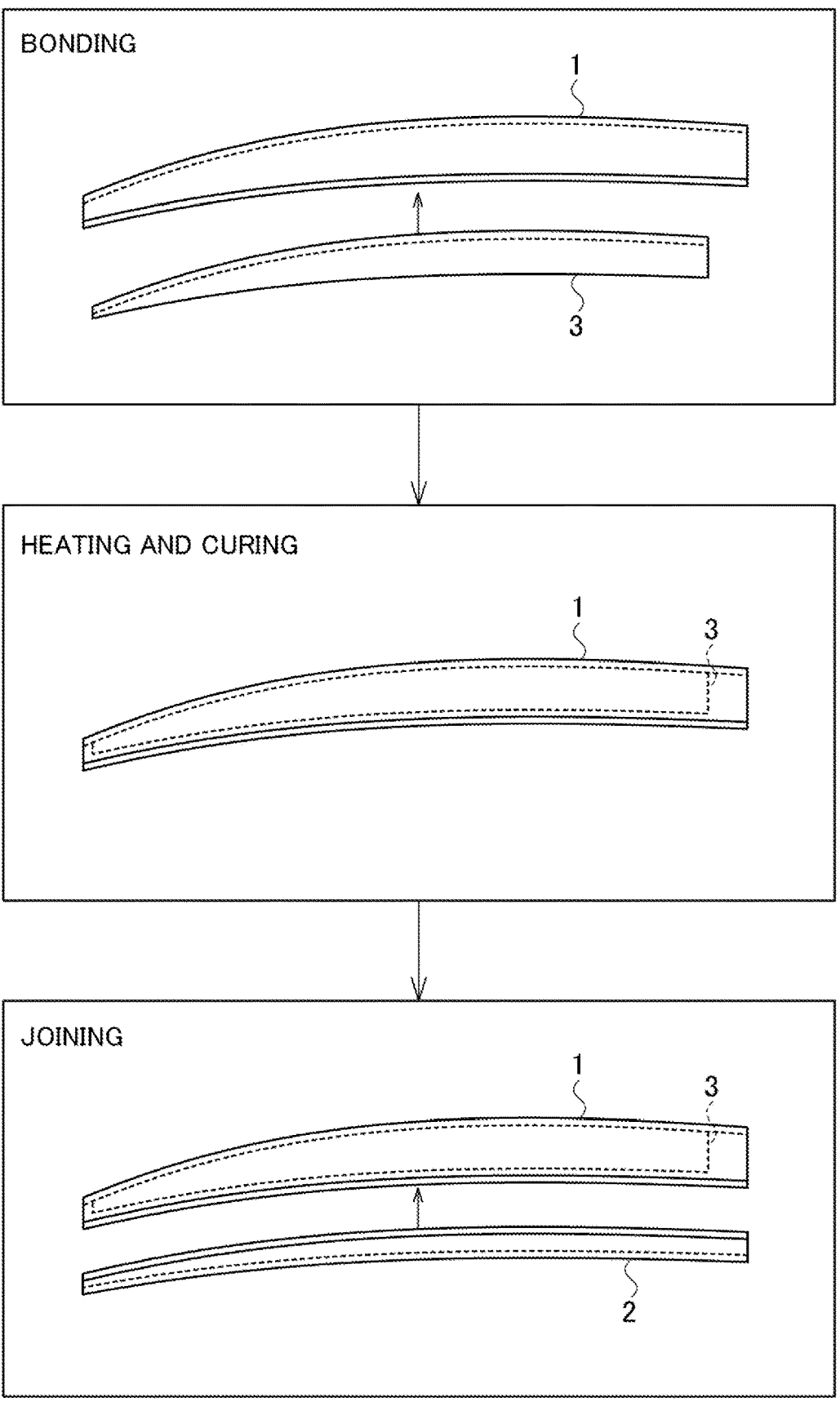
FIG. 3 is a flowchart illustrating a method of the first embodiment.

The method of manufacturing the center pillar includes the steps as illustrated in FIG. 3. Specifically, in this method, the FRP material 3 is attached to the outer panel 1 with the adhesive 4, the outer panel 1 to which the FRP material 3 is attached is put into a heating furnace or the like to heat the FRP material 3 and the adhesive 4 together with the outer panel 1 and cure the FRP material 3 and the adhesive 4, and the inner panel 2 is joined to the outer panel 1 in which the FRP material 3 and the adhesive 4 are cured.

The FRP material 3 is preferably uncured at a stage where the FRP material 3 is to be attached to the outer panel 1. In the attachment to the outer panel 1, the flexibility of the FRP material 3 allows a bonding surface thereof to deform and follow a surface of the outer panel 1 including a curved surface and allows the FRP material 3 to come into tight contact with the outer panel 1. This can improve the integrity of the FRP material 3 and the outer panel 1 after the curing and secure the design strength of the center pillar more surely.

The adhesive 4 is a thermosetting adhesive whose curing is promoted by heat and a publicly known adhesive such as, for example, acryl, epoxy, or urethane based adhesive can be used. Selecting an adhesive having similar curing temperature to the curing temperature of the matrix resin of the FRP material 3 as the adhesive 4 allows the curing of the FRP material 3 and the curing of the adhesive 4 to be performed simultaneously in one heating operation. Heating conditions in this case are not limited to particular conditions and may be, for example, heating temperature of about 180° C. and heating time of about 20 minutes. Note that the adhesive 4 may be the matrix resin of the FRP material 3. Specifically, the matrix resin itself may function as the adhesive 4 by, for example, increasing the content ratio of the matrix resin in an outermost layer to be a bonding surface of the uncured FRP material 3. In this case, a step of applying the adhesive 4 can be omitted and the productivity is improved.

Operations and effects of the embodiment are described below.

As described above, the coefficient of linear expansion of the FRP material 3 is lower than the coefficients of linear expansion of the outer panel 1 and the inner panel 2. Accordingly, the following problems occur in the case where (hereinafter, this case is referred to as "comparative example"): the FRP material 3 is attached to the outer panel 1 with the adhesive 4; the outer panel 1 and the inner panel 2 are joined to each other; and then the joined outer panel 1 and inner panel 2 are heated to cure the FRP material 3 and the adhesive 4. Specifically, in the heating and curing step, as illustrated in the upper and middle stages of FIG. 4, a joined body 5 formed of the outer panel 1 and the inner panel 2 joined to each other thermally expands at a greater degree than the FRP material 3. Then, as illustrated in the middle stage of FIG. 4, the FRP material 3 and the adhesive 4 are cured in this state and the FRP material 3 is bonded to the outer panel 1. In this case, as illustrated in the middle stage of FIG. 4, a thermal expansion amount $\Delta E_1$ in the outer panel 1 of the center pillar according to the comparative example is substantially equal to a thermal expansion amount $\Delta E_2$ in the inner panel 2 of the center pillar.

Figure 4:
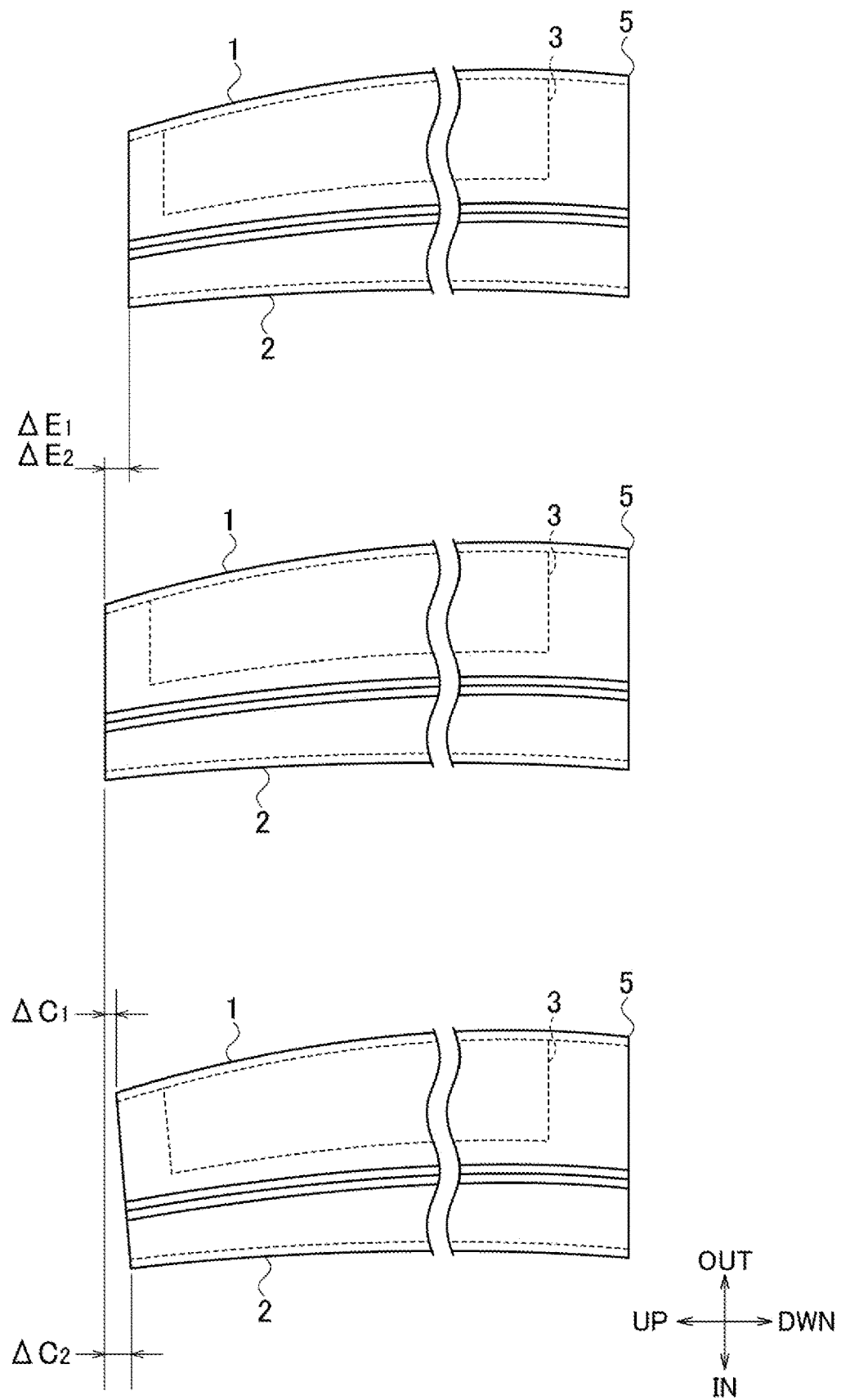
FIG. 4 is a view for explaining a mechanism of how deformation occurs in a method of a comparative example.

In a subsequent cooling process, as illustrated in the middle and lower stages of FIG. 4, a portion of the joined body 5 to which the FRP material 3 is bonded thermally contracts while being restrained by the FRP material 3. Meanwhile, a portion of the joined body 5 to which no FRP material 3 is bonded thermally contracts without being restrained by the FRP material 3. Accordingly, as illustrated in the lower stage of FIG. 4, the degree of thermal contraction (thermal contraction amount) is such that a thermal contraction amount $\Delta C_2$ in the inner panel 2 is greater than a thermal contraction amount $\Delta C_1$ in the outer panel 1. This uneven thermal contraction causes undesirable deformation (buckles, warps, and the like) in the center pillar that is the closed cross-section structural member. In the center pillar according to the comparative example, the joined body 5 curves to be concave in a direction from the outer panel 1 toward the inner panel 2 or to be convex in a direction from the inner panel 2 toward the outer panel 1.

Meanwhile, in the method according to the embodiment, as illustrated in FIG. 3, the FRP material 3 and the adhesive 4 are cured and then the inner panel 2 is joined to the outer panel 1. Accordingly, effects of the thermal contraction in the inner panel 2 in the cooling process on the shape or dimensions of the center pillar can be reduced or eliminated. Undesirable deformation of the center pillar that is the closed cross-section structural member can be thereby suppressed.

Moreover, in the method according to the embodiment, a distance between the centers of figures of the members (FRP material 3 and the other member) that thermally contract after the heating and curing step in the cross-section orthogonal to the longitudinal direction of the center pillar is smaller than that in the comparative example. Specifically, a distance La (see FIG. 2) between the center of figure $D_3$ of the FRP material 3 and the center of figure $D_1$ of the outer panel 1 that is the member other than the FRP material 3 is smaller than a distance Lb (see FIG. 2) between the center of figure $D_3$ of the FRP material 3 and the center of figure $D_5$ of the joined body 5 that is the member other than the FRP material 3 in the comparative example. Accordingly, in the embodiment, a bending moment caused by a gap between a line of action of resultant force of tensile stress generated in the member other than the FRP material 3 and a line of action of resultant force of compression stress generated in the FRP material 3 in the thermal contraction is smaller than that in the comparative example.

Moreover, in the method according to the embodiment, the outer panel 1 is provided with the front wall 12 and the rear wall 13 and the FRP material 3 is provided with the front wall 32 extending along the front wall 12 and the rear wall 33 extending along the rear wall 13. Accordingly, the distance La (see FIG. 2) between the center of figure $D_1$ of the outer panel 1 and the center of figure $D_3$ of the FRP material 3 in the cross-section orthogonal to the longitudinal direction of the center pillar can be reduced from that in the case where the FRP material 3 is provided with only the outer wall 31. Specifically, the bending moment caused by the gap between the line of action of resultant force of tensile stress generated in the outer panel 1 and the line of action of resultant force of compression stress generated in the FRP material 3 in the thermal contraction can be reduced. Deformation of the outer panel 1 in the joining to the inner panel 2 can be thereby suppressed from that in the case where the FRP material 3 is provided with only the outer wall 31.

Note that, in the cooling process after the heating and curing step, the outer panel 1 and the FRP material 3 taken out of the heating furnace may be forcedly cooled or naturally cooled. The outer panel 1 and the FRP material 3 may be slowly cooled by being left in the heating furnace for about one day. The outer panel 1 and the FRP material 3 do not necessarily have to be cooled to normal temperature (for example, 5° C. to 35° C.). The outer panel 1 to which the FRP material 3 is bonded may be joined to the inner panel 2 before the outer panel 1 and the FRP material 3 reach normal temperature or in the middle of the cooling process. Moreover, the thermal contraction in the cooling process of the outer panel 1 and the FRP material 3 may be reduced by, for example, joining the inner panel 2 at the normal temperature to the outer panel 1 in the middle of the cooling process. Specifically, it is possible to generate compression stress in the inner panel 2 by the thermal contraction in the outer panel 1 and cancel out curving deformation of the outer panel 1 and the FRP material 3 in which the inner panel 2 side becomes concave.

Second Embodiment

Figure 5:
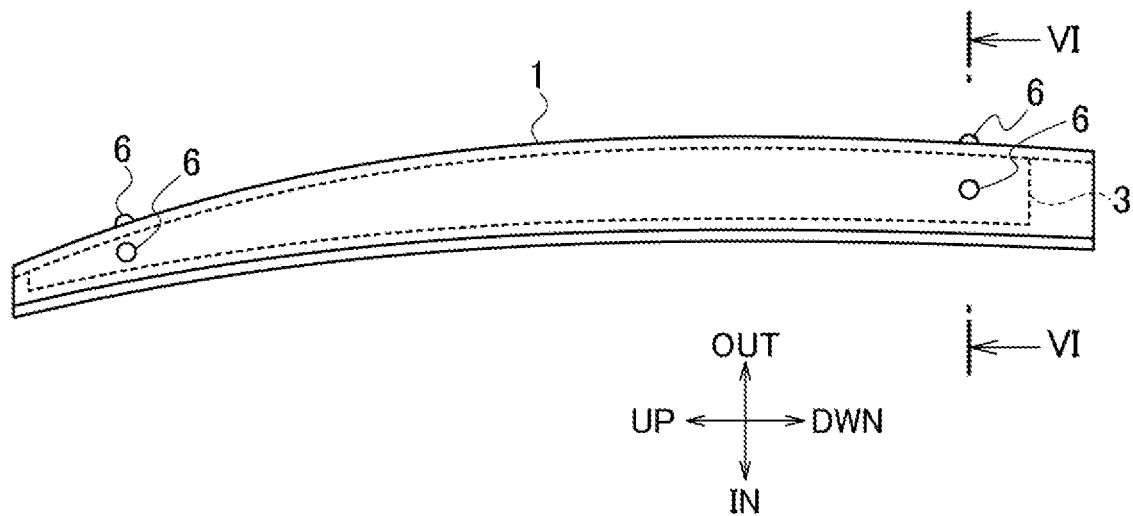
FIG. 5 is a side view of a center pillar according to a method of a second embodiment.

In a method according to a second embodiment, in the attachment of the FRP material 3 to the outer panel 1 by the method according to the first embodiment, both longitudinal direction end portions of the FRP material 3 are fastened to the outer panel 1 by using, for example, fasteners 6 such as self piercing rivets as illustrated in FIG. 5. Then, the FRP material 3 and the adhesive 4 are cured by being heated together with the outer panel 1 with the FRP material 3 held on the outer panel 1 with the fasteners 6. Note that the fastening portions fastened by the fasteners 6 are not limited to those in the illustrated example and may be provided in, for example, a longitudinal direction center region of the FRP material 3 or multiple portions of the FRP material 3 in the longitudinal direction.

In the embodiment, the FRP material 3 and the adhesive 4 are cured by being heated together with the outer panel 1 with the FRP material 3 held on the outer panel 1 with the fasteners 6. Accordingly, the FRP material 3 can be accurately aligned with respect to the outer panel 1 throughout the step of attaching the FRP material 3 to the outer panel 1 with the adhesive 4 and the heating and curing step.

Moreover, in the embodiment, the outer panel 1 and the FRP material 3 are more firmly coupled to one another by the fasteners 6. Thus, in the thermal expansion and the thermal contraction of the outer panel 1 and the FRP material 3 throughout the heating and curing step and the subsequent cooling process, the difference in the thermal expansion amount or the thermal contraction amount between the outer panel 1 and the FRP material 3 can be reduced from that in the case where there is no coupling by the fasteners 6. Residual stress in the outer panel 1, the FRP material 3, and the adhesive 4 after the curing of the FRP material 3 and the adhesive 4 can be thereby reduced.

Furthermore, in the embodiment, the coupling by the fasteners 6 causes the restraining force of the FRP material 3 to act more efficiently on the outer panel 1 throughout the heating and curing step and the cooling process. Accordingly, the thermal expansion and thermal contraction of the outer panel 1 are suppressed from that in the case where there is no coupling by the fasteners 6. Thus, it is possible to reduce stretching of the outer panel 1 in the joining to the inner panel 2 and further suppress the unfavorable deformation of the center pillar after the joining.

Figure 6:
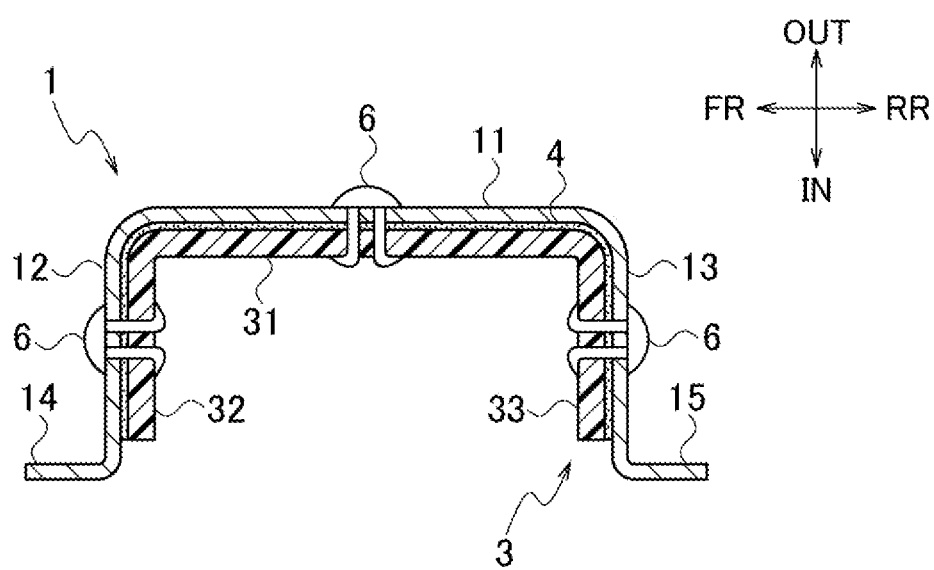
FIG. 6 is a cross-sectional view taken along the line VI-VI in FIG. 5.

Moreover, the fastening portions may be such that, as illustrated in FIG. 6, the outer wall 31 of the FRP material 3 is held on the outer wall 11 of the outer panel 1 with the fastener 6 and the front wall 32 and the rear wall 33 of the FRP material 3 are held on the front wall 12 and the rear wall 13 of the outer panel 1 with the fasteners 6. In this case, the restraining force of the FRP material 3 acts more efficiently on the outer panel 1 against torsional deformation in the longitudinal direction of the outer panel 1 throughout the heating and curing step and the subsequent cooling process. The torsional deformation of the outer panel 1 in a state prior to the joining to the inner panel 2 can be thereby suppressed. Note that the arrangement of the fasteners 6 in the fastening portion is not limited to that in the illustrated example.

Although multiple embodiments are described above, these embodiments are merely examples described to facilitate the understanding of the invention. The technical scope of the invention is not limited to the specific technical matters disclosed in the aforementioned embodiments and includes various modifications, changes, alternative techniques, and the like that can be easily derived from the specific technical matters.

For example, although the FRP material 3 is bonded to the outer panel 1 in the aforementioned embodiments, the FRP material 3 may be bonded to the inner panel 2. Moreover, although the FRP material 3 is bonded to the inner surface of the outer panel 1, the FRP material 3 may be bonded to the outer surface.

Furthermore, although the FRP material 3 has the C-shape cross-section in the aforementioned embodiments, the shape thereof is not limited to a particular shape as long as the FRP material 3 has a shape that can be bonded to the outer panel 1. The cross-sectional shape of the FRP material 3 may be, for example, a V-shape, an E-shape, a rectangular shape, or the like.

In the aforementioned embodiments, description is given by using the center pillar as an example of the closed cross-section structural member. However, the methods according to the aforementioned embodiments can be applied as methods for manufacturing other closed cross-section structural members of vehicles such as an automobile as a matter of course, examples of the other closed cross-section structural members including a front pillar, a rear pillar, a side sill, a roof rail, a suspension member, and the like.

INDUSTRIAL APPLICABILITY

The aforementioned methods can be used as a method of manufacturing a closed cross-section structural member in a vehicle such as an automobile.

REFERENCE SIGNS LIST 1 outer panel (first panel)
2 inner panel (second panel)
3 FRP material
4 adhesive
6 fastener
11 outer wall (first wall)
12 front wall (second wall)
13 rear wall (second wall)
31 outer wall (third wall)
32 front wall (fourth wall)
33 rear wall (fourth wall)

The invention claimed is:

1. A method of manufacturing a closed cross-section structural member including: a first panel and a second panel joined to each other to form a closed cross-section; and a FRP material bonded to the first panel and having a coefficient of linear expansion lower than a coefficient of linear expansion of the first panel and a coefficient of linear expansion of the second panel, the method comprising:

attaching the FRP material to the first panel with an adhesive;

curing the FRP material and the adhesive by heating the FRP material and the adhesive together with the first panel; and joining the second panel to the first panel in which the FRP material and the adhesive are cured, such that a thermal expansion of the first panel and a thermal expansion of the second panel are substantially equal when joining.

2. The method according to claim 1, wherein the FRP material and the adhesive are cured by being heated together with the first panel with the FRP material held on the first panel with fasteners.

3. The method according to claim 2, wherein the first panel is provided with a first wall and paired second walls that face each other and that extend in a direction intersecting the first wall, from both end portions of the first wall, respectively, in a cross-section orthogonal to a longitudinal direction of the closed cross-section structural member, the FRP material is provided with a third wall that extends along the first wall and paired fourth walls that extend along the second walls, from both end portions of the third wall, respectively, and when the FRP material is held on the first panel with the fasteners, the third wall is held on the first wall with the fastener and the paired fourth walls are held on the paired second walls with the fasteners, respectively.

* * * * *